(12) United States Patent
Morgan

(10) Patent No.: US 9,539,172 B1
(45) Date of Patent: Jan. 10, 2017

(54) CARDIOPULMONARY RESUSCITATION DEVICE

(71) Applicant: Brent F. Morgan, Glendale, AZ (US)

(72) Inventor: Brent F. Morgan, Glendale, AZ (US)

( * ) Notice: Subject to any disclaimer, the term of this patent is extended or adjusted under 35 U.S.C. 154(b) by 0 days.

(21) Appl. No.: 14/975,407

(22) Filed: Dec. 18, 2015

Related U.S. Application Data

(63) Continuation-in-part of application No. 14/849,497, filed on Sep. 9, 2015.

(51) Int. Cl.
*A61H 31/00* (2006.01)

(52) U.S. Cl.
CPC .......... *A61H 31/005* (2013.01); *A61H 31/007* (2013.01)

(58) Field of Classification Search
CPC .............. A61H 31/00; A61H 2031/001; A61H 2031/002; A61H 2031/003; A61H 31/004; A61H 31/005; A61H 31/007; A61H 31/008
See application file for complete search history.

(56) References Cited

U.S. PATENT DOCUMENTS

| | | | | |
|---|---|---|---|---|
| 3,219,031 A * | 11/1965 | Rentsch, Jr. | ......... | A61H 31/007 601/41 |
| 3,739,771 A * | 6/1973 | Gaquer | ................ | A61H 31/007 601/41 |
| 3,782,371 A * | 1/1974 | Derouineau | ......... | A61H 31/007 601/105 |
| 5,399,148 A * | 3/1995 | Waide | .................... | A61H 31/00 601/106 |
| 5,496,257 A * | 3/1996 | Kelly | ................... | A61H 31/005 600/454 |
| 6,174,295 B1 * | 1/2001 | Cantrell | ................. | A61H 31/00 601/41 |
| 6,332,872 B1 * | 12/2001 | Young | .................. | A61H 31/007 601/107 |
| 7,310,553 B2 * | 12/2007 | Freeman | .............. | A61H 31/005 601/41 |
| 8,535,251 B1 * | 9/2013 | Rao | ...................... | A61H 31/007 601/41 |
| 2010/0198118 A1 * | 8/2010 | Itnati | .................... | A61H 31/004 601/41 |
| 2015/0120201 A1 * | 4/2015 | Silver | .................... | A61H 31/00 702/19 |

\* cited by examiner

*Primary Examiner* — Steven Douglas
(74) *Attorney, Agent, or Firm* — Morgan Law Offices, PLC

(57) ABSTRACT

A cardiopulmonary resuscitation device includes a case having an extension portion extending therefrom. In operation, the user places the case across the chest of a person being given CPR, and presses the case into the person's chest, applying uniform force in according to a rhythm guided by audible and/or visual feedback. The cardiopulmonary resuscitation device includes a control circuit having a display screen, and a distance sensor apparatus operatively coupled to the control circuit. In another embodiment, the cardiopulmonary resuscitation device is structured for use on an infant-sized human. In this embodiment, the device includes a pair of legs extending through the case, the support structure permitting the case to be positioned on the chest of an infant-sized human; wherein the case is useable to perform cardiopulmonary resuscitation on the infant-sized human by repeated press-release movements using a finger pad disposed on the case.

18 Claims, 15 Drawing Sheets

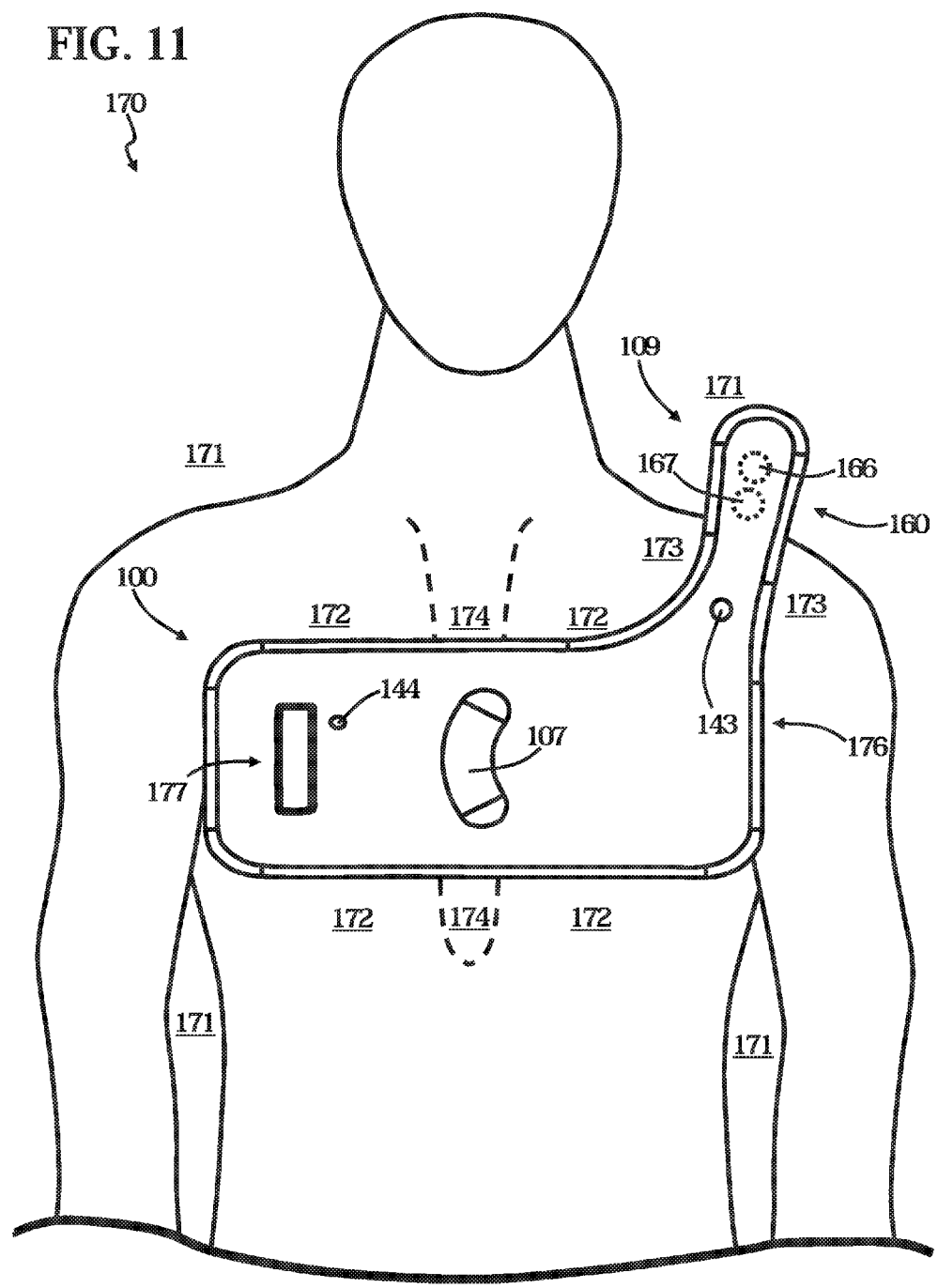

CARDIOPULMONARY RESUSCITATION DEVICE

CROSS-REFERENCE TO RELATED APPLICATIONS

This application is a continuation-in-part of Ser. No. 14/849,497, entitled "CARDIOPULMONARY RESUSCITATION DEVICE," to Brent F. Morgan, filed Sep. 9, 2015, the subject matter of which is incorporated herein by reference.

BACKGROUND OF THE INVENTION

Field of the Invention

This invention relates generally to an artificial resuscitation device.

Description of the Related Art

Cardiopulmonary resuscitation (CPR) is an emergency procedure that involves the compression and decompression of the thoracic cavity in response to pressure applied to the sternum. CPR is typically performed in many different emergency situations, such as when a person is experiencing circulatory arrest (i.e. cardiac arrest) and respiratory arrest (e.g. drowning).

It is known that most people who receive CPR outside of a hospital do not survive. For example, recent statistics indicate that only about 8% of people who receive CPR outside of a hospital survive. Conversely, about 88% of those who receive CPR at a hospital do survive. One reason people do not survive when receiving CPR outside of a hospital is that the CPR is not performed correctly. In some instances, the pressure applied during compression is not applied evenly. The applied pressure often will not compress the entire thoracic cavity to get adequate pumping started. Instead, the applied pressure is applied as a sharp force to the sternum. The sternum must also be compressed/decompressed at an optimal distance and rate. The chances of a successful resuscitation are greatly reduced if the chest is compressed too deeply or in too shallow a manner. Further, in an emergency situation, people would greatly benefit from a device that is simple to use and quickly guides them through the steps necessary to successfully perform CPR. Hence, it would be desirable to provide an alternative to conventional manual CPR techniques that particularly non-medical personnel can perform properly so as to increase the likelihood of surviving.

BRIEF SUMMARY OF THE INVENTION

The present invention is directed to a cardiopulmonary resuscitation device which aids in the performance of CPR. The novel features of the invention are set forth with particularity in the appended claims. The invention will be best understood from the following description when read in conjunction with the accompanying drawings.

BRIEF DESCRIPTION OF THE DRAWINGS

It should be noted that like reference characters are used throughout the several views of the drawings.

FIG. 11 is a front view of the cardiopulmonary resuscitation device of FIG. 1 being operated by a user when performing CPR on a patient.

DETAILED DESCRIPTION OF THE INVENTION

Figure 1:
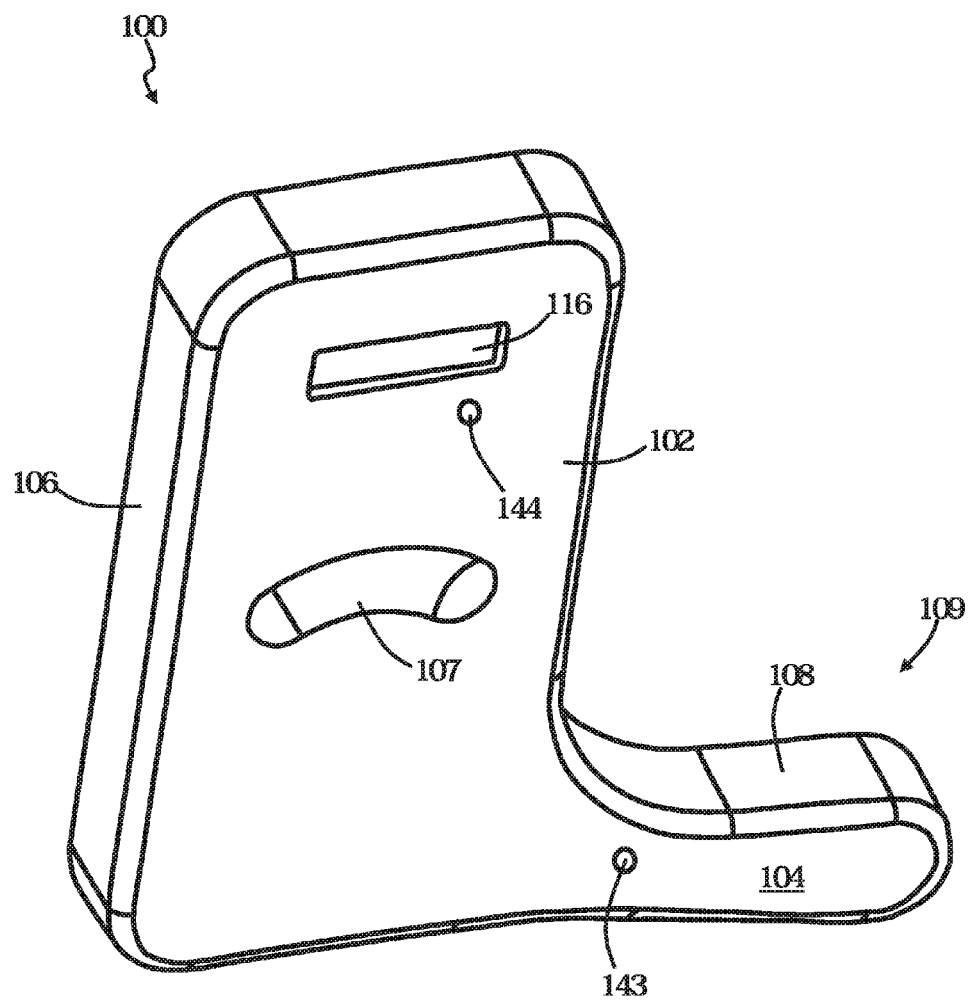
FIG. 1 is a perspective view of a cardiopulmonary resuscitation device.
Figure 2:
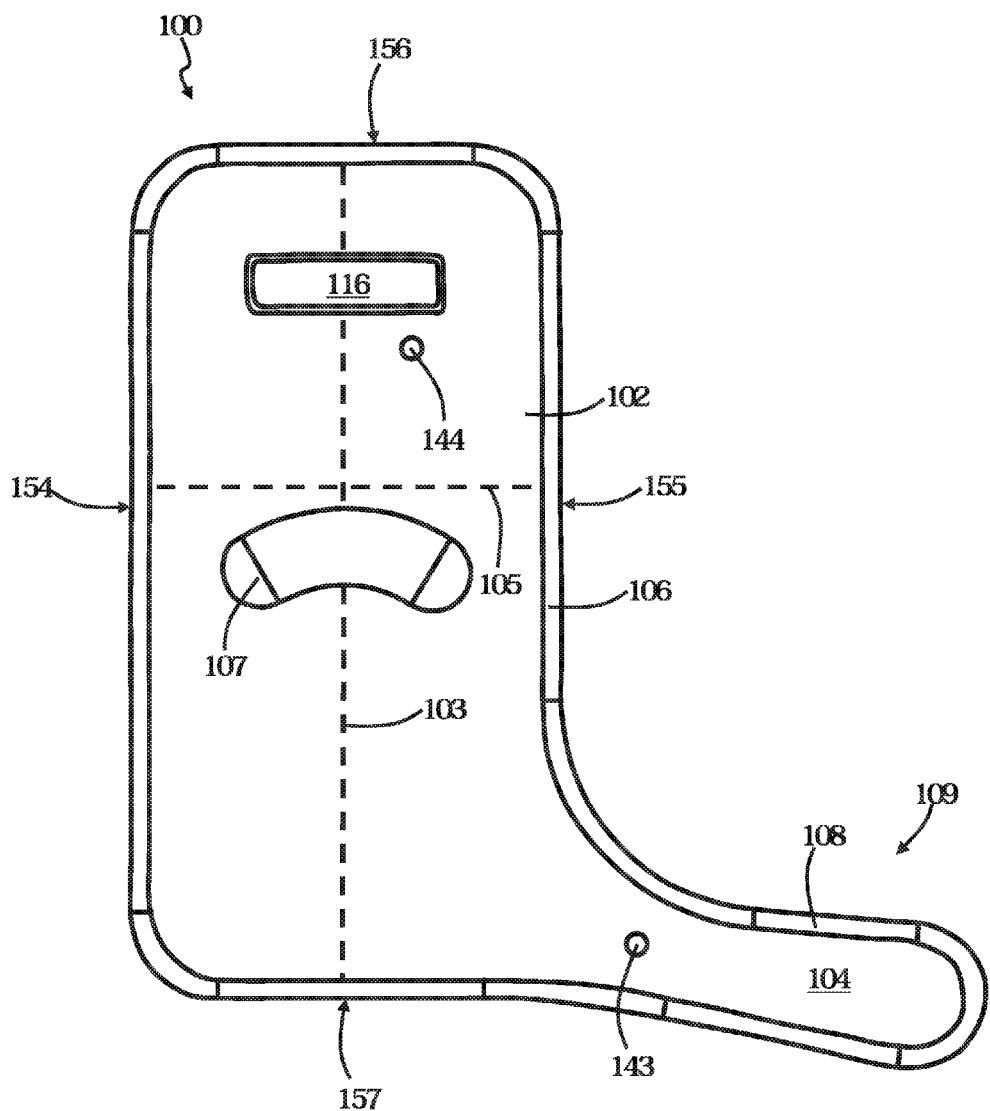
FIG. 2 is side view of the cardiopulmonary resuscitation device of FIG. 1.
Figure 3:
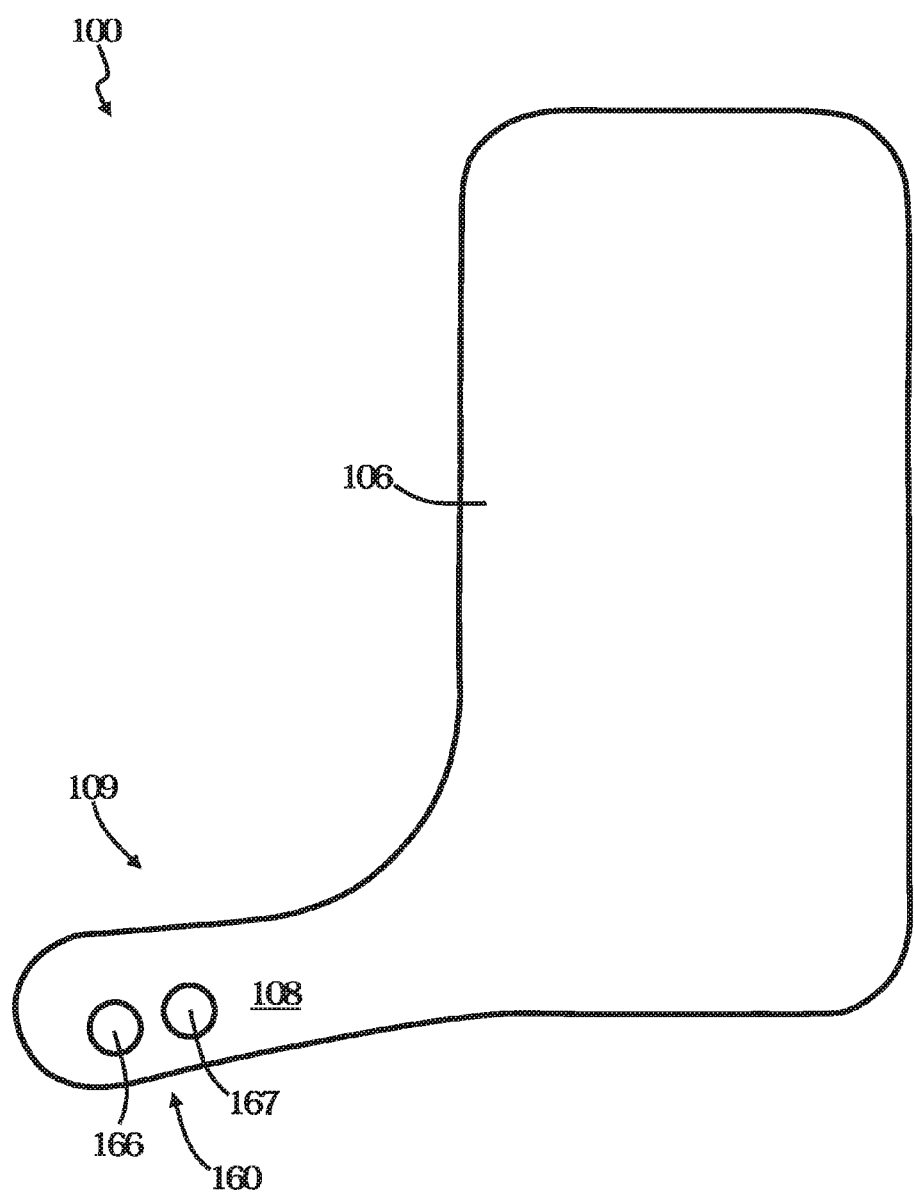
FIG. 3 is an opposed side view of the cardiopulmonary resuscitation device of FIG. 1.

FIG. 1 is a perspective view of a cardiopulmonary resuscitation device 100. FIG. 2 is side view of the cardiopulmonary resuscitation device 100 of FIG. 1, and FIG. 3 is an opposed side view of the cardiopulmonary resuscitation device 100 of FIG. 1. In this embodiment, the cardiopulmonary resuscitation device 100 includes a cover 102 and case 106, which are coupled together in a repeatably removeable manner. In this embodiment, the case 102 includes a gripping portion 107, which facilitates the ability to hold the cardiopulmonary resuscitation device 100 with hands.

As shown in FIG. 2, the cardiopulmonary resuscitation device 100 has is shaped to have opposed lengthened sides 154 and 155, and opposed shortened sides 156 and 157. A length axis 103 and width axis 105 are shown in FIG. 2 for reference purposes only. The length axis extends between the shortened sides 156 and 157, and the width axis extends between the opposed lengthened sides 154 and 155. It should be noted that a lengthened side is longer than the shortened side, and a shortened side is shorter than the lengthened side. The lengthened sides 154 and 155 can have many different lengths. In some embodiments, the lengthened sides 154 and 155 are less than about eighteen inches. In some embodiments, the lengthened sides 154 and 155 are between about eight inches and eighteen inches. In general, the lengthened sides 154 and 155 are chosen to have lengths that match the chest width of a typical human.

The cover 102 and case 106 can include many different types of material, such as plastic. In some embodiments, the cardiopulmonary resuscitation device 100 includes a backing of resilient material, such as foam. The backing of resilient material can be positioned at many different locations, such as on the cover 102 and/or case 106.

In this embodiment, the cardiopulmonary resuscitation device 100 includes an extension portion 109, wherein the extension portion 109 includes portions of the cover 102 and case 106. In particular, the extension portion 109 includes a cover extension portion 104, wherein the cover extension portion 104 is included with the cover 102. Further, the extension portion 109 includes a case extension portion 108, wherein the case extension portion 108 is included with the case 106. The extension portion 109 provides the cardiopulmonary resuscitation device 100 with an L-shape. The extension portion 109 extends in a direction substantially away from the length axis 103. The extension portion 109 extends in the same substantial direction as the width axis 105. In this embodiment, the extension portion 109 extends from proximate to the intersection of the lengthened side 155 and the shortened side 157. It should be noted, however, that the extension portion 109 can extend from other portions, such as the intersection of the lengthened side 154 and the shortened side 157.

In this embodiment, and as shown in FIGS. 1 and 2, the cardiopulmonary resuscitation device 100 includes a display screen 116, which extends through the cover 102. Display screen 116 will be discussed in more detail below with FIGS. 5, 6, 7 and 8. The display screen 116 is carried by a circuit board 110 (FIGS. 4, 6, 7, and 8). The display screen 116 is for displaying information regarding the operation of the cardiopulmonary resuscitation device 100.

In this embodiment, and as shown in FIGS. 1 and 2, the cardiopulmonary resuscitation device 100 includes a pressure switch 142, which is disposed inside the case 106. The pressure switch 142 will be discussed in more detail below with FIGS. 5 and 8. The pressure switch 142 can be of many different types, such as a force sensing resistor. The resistance of the force sensing resistor changes in response to an applied force.

In this embodiment, and as shown in FIGS. 1 and 2, the cardiopulmonary resuscitation device 100 includes a luminaire 144, which extends through the cover 102. The luminaire 144 is useful to provide the user of the cardiopulmonary resuscitation device 100 with a visual indication that the sternum is being compressed and decompressed the desired distance. The luminaire 144 will be discussed in more detail below with FIGS. 5 and 8.

In some embodiments, the cardiopulmonary resuscitation device 100 includes a luminaire 143, which extends through the cover 102. The luminaire 143 can provide the visual indication that the sternum is being compressed and decompressed the desired distance. In some embodiments, the luminaire 144 indicates when the device is on or off, and the luminaire 143 provide the visual indication that the sternum is being compressed and decompressed the desired distance.

In this embodiment, and as shown in FIG. 3, the cardiopulmonary resuscitation device 100 includes a distance sensor apparatus 160, which extends through the case 106. The distance sensor apparatus 160 will be discussed in more detail below with FIGS. 4, 5, 9, and 10. The distance sensor apparatus 160 includes a receive sensor 166 and transmit sensor 167, which extend through the case 106. In particular, the receive and transmit sensors 166 and 167 extend through the case extension portion 108. The receive and transmit sensors 166 and 167 can extend through the case 106 in many different ways. In this embodiment, the receive and transmit sensors 166 and 167 extend through corresponding openings of the case 106. In general, the receive and transmit sensors 166 and 167 extend through at least one opening of the case 106. It should be noted that the opening(s) through which the receive and transmit sensors 166 and 167 are opposed to the opening through which the display screen 116 extends (FIGS. 1 and 2). In this way, the display screen 116 and distance sensor apparatus 160 face opposed directions.

Figure 4:
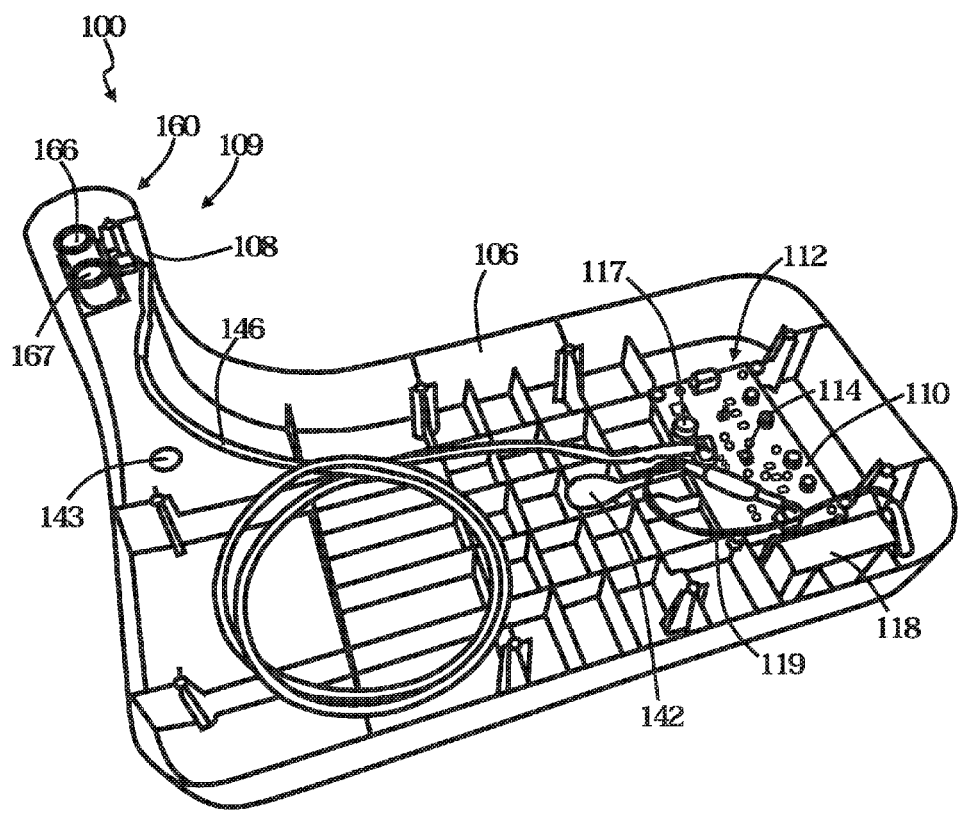
FIG. 4 is perspective view of the inside of the cardiopulmonary resuscitation device of FIG. 1 showing a circuit board, which carries control circuitry, and a distance sensor apparatus in communication therewith.
Figure 7:
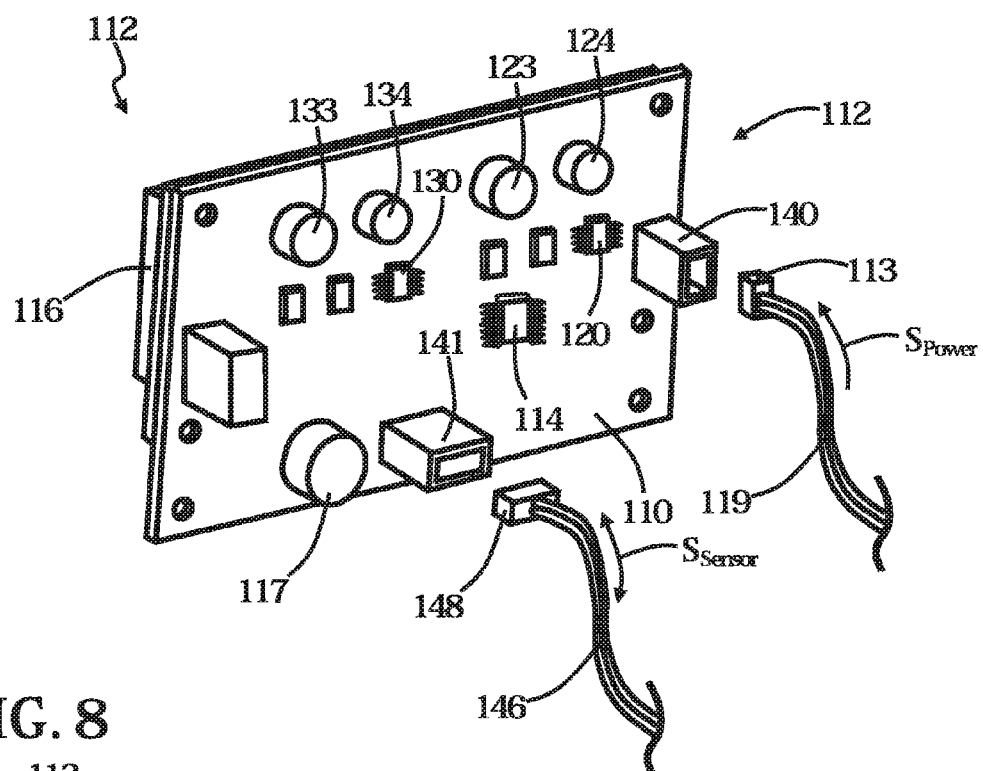
FIG. 7 is a perspective view of the circuit board and control circuitry of FIG. 4.
Figure 8:
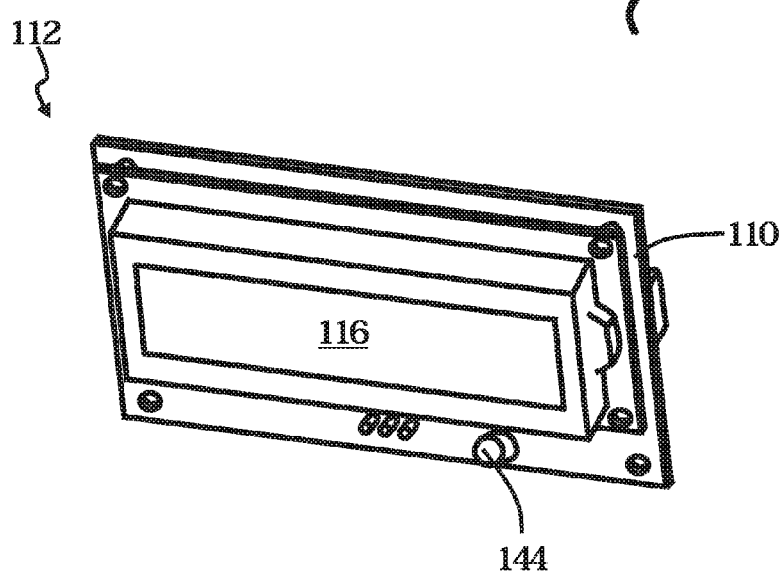
FIG. 8 is an opposed perspective view of the circuit board and control circuitry of FIG. 4.

FIG. 4 is perspective view of the inside of the cardiopulmonary resuscitation device 100 of FIG. 1 with the cover 102 removed from the case 106. In this embodiment, the cardiopulmonary resuscitation device 100 includes the circuit board 110, which is carried by the case 106. The circuit board 110 carries the control circuitry 112, which controls the operation of the cardiopulmonary resuscitation device 100. It should be noted that the display screen 116 is positioned on the opposite side of the circuit board 110 in FIG. 4, as is shown in FIGS. 7 and 8.

The devices included with the control circuitry 112 will be discussed in more detail below. In this embodiment, the control circuitry 112 includes a microcontroller 114, which controls the operation of the cardiopulmonary resuscitation device 100. The control circuitry 112 includes a sound device 117, which is operatively coupled to the microcontroller 114. As will be discussed in more detail below, the sound device 117 provides a sound indication in response to receiving a sound signal $S_{Sound}$ (FIG. 5) from the microcontroller 114. In this embodiment, the sound indication corresponds to an audible sound. The audible sound is within a frequency range of human hearing. The microcontroller 114 provides the sound signal $S_{Sound}$ in response to movement of the cardiopulmonary resuscitation device 100. The sound signal $S_{Sound}$ is useful to provide the user of the cardiopulmonary resuscitation device 100 with an audible indication that the sternum is being compressed and decompressed the desired distance. In an embodiment, the signal $S_{Sound}$ will also indicate that the desired distance was not reached. This might happen if the compression/decompression was done in either too shallow a manner or was done too deeply. In this case, the signal $S_{Sound}$ can be used to generate a different sound altogether to indicate an improper action. Thus, the person performing CPR is provided auditory feedback as to whether the CPR is being done correctly or incorrectly. It should be noted that, in some embodiments, the luminaire 144 operates in response to receiving the sound signal $S_{Sound}$. This feature is useful so that the luminaire 144 operates when the sound device 117 operates. The luminaire 144 is provided power so it is capable of operating when the pressure switch 142 has an activated condition, as will be discussed in more detail below.

The cardiopulmonary resuscitation device 100 includes a battery 118, which is carried by the case 106 and positioned proximate to the circuit board 110. The battery 118 provides power to the control circuitry 112 through a battery cable 119, as will be discussed below with FIG. 7.

As mentioned above, the cardiopulmonary resuscitation device 100 includes the distance sensor apparatus 160. The distance sensor apparatus 160 is carried by the case 106, as shown in FIG. 4. In particular, the distance sensor apparatus 160 is carried by the case extension portion 108. The distance sensor apparatus 160 is positioned between the case extension portion 108 and the cover extension portion 104. The distance sensor apparatus 160 is connected to the control circuitry 112 through a sensor cable 146, as will be discussed below with FIGS. 9 and 10.

Figure 5:
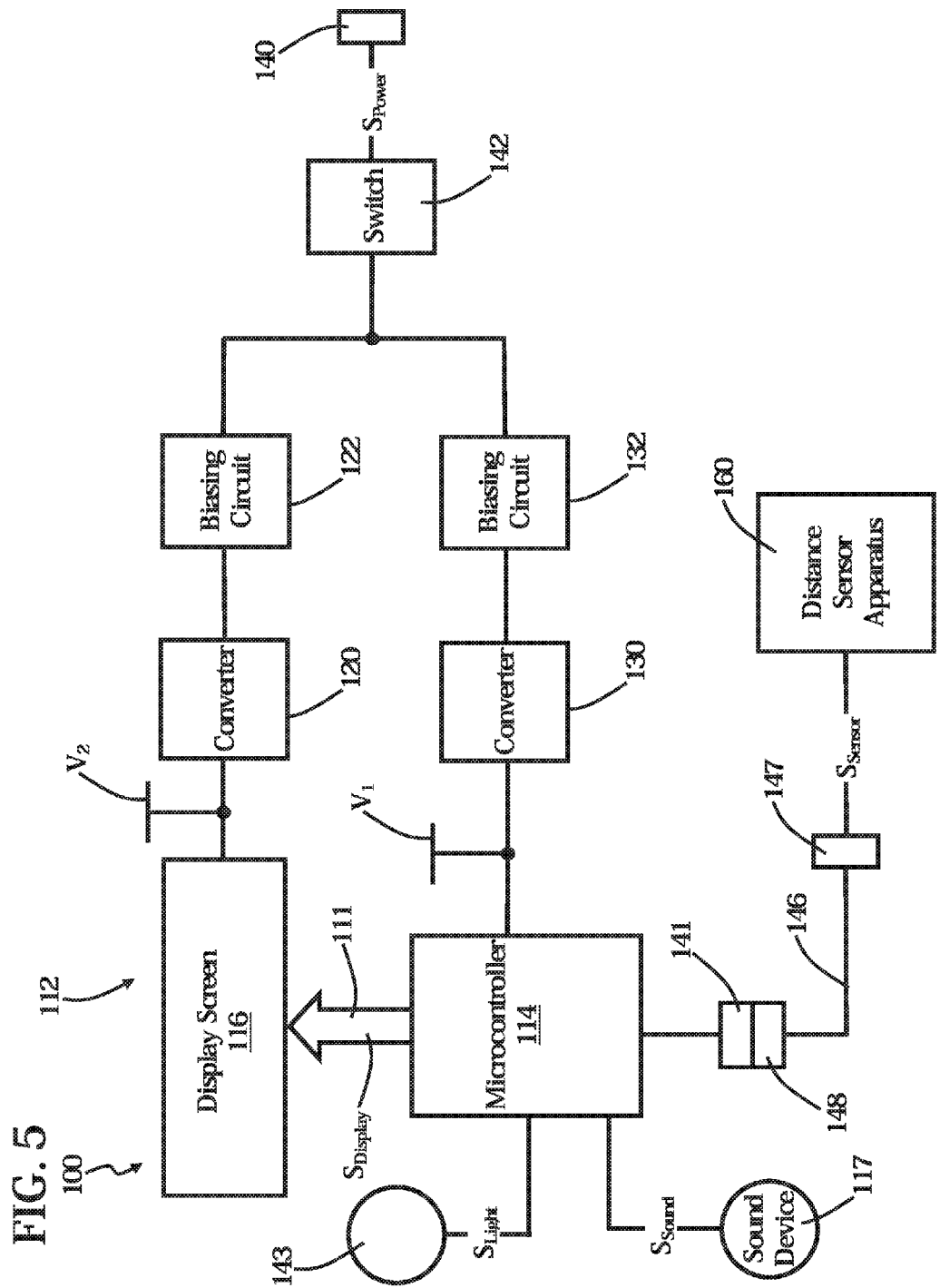
FIG. 5 is a block diagram of one embodiment of the cardiopulmonary resuscitation device of FIG. 1 showing the control circuitry and distance sensor of FIG. 4.

FIG. 5 is a block diagram of one embodiment of the cardiopulmonary resuscitation device 100 of FIG. 1. As mentioned above, the cardiopulmonary resuscitation device 100 includes the sound device 117 operatively coupled to the microcontroller 114. The sound device 117 provides the sound indication in response to receiving the sound signal $S_{Sound}$ from the microcontroller 114. The microcontroller 114 provides the sound signal $S_{Sound}$ to the sound device 117 in response to movement of the cardiopulmonary resuscitation device 100, as will be discussed in more detail below.

In this embodiment, the cardiopulmonary resuscitation device 100 includes the luminaire 143 operatively coupled to the microcontroller 114. The luminaire 143 provides the visual indication in response to receiving the light signal $S_{Light}$ from the microcontroller 114. The microcontroller 114 provides the light signal $S_{Light}$ to the luminaire 143 in response to movement of the cardiopulmonary resuscitation device 100, as will be discussed in more detail below. It should be noted that, in some embodiments, the light signal $S_{Light}$ is provided by the sound device 117 so that the sound indication and visual indication are provided a substantially the same time.

In this embodiment, the display screen 116 is operatively coupled to the microcontroller 114 through a display channel 111 so that a display signal $S_{Display}$ flows therebetween. The display signal $S_{Display}$ includes information it is desired to display on display screen 116, as will be discussed in more detail below.

As mentioned above, the cardiopulmonary resuscitation device 100 includes the pressure switch 142. In this embodiment, the pressure switch 142 is connected directly to the circuit board 110, and the battery cable connector 140 is connected to the battery cable 119 (FIG. 4) in a repeatably removeable manner. The battery 118 (FIG. 4) provides a power signal $S_{Power}$ to the battery cable connector 140 through the battery cable 119.

In this embodiment, the cardiopulmonary resuscitation device 100 includes biasing circuits 122 and 132 operatively coupled to the pressure switch 142. The pressure switch 142 is repeatably moveable between activated and deactivated conditions. In the activated condition, the pressure switch 142 allows the power signal $S_{Power}$ to flow to the biasing circuits 122 and 132. In the deactivated condition, the pressure switch 142 does not allow the power signal $S_{Power}$ to flow to the biasing circuits 122 and 132. In some embodiments, the pressure switch 142 moves from the deactivated condition to the activated condition in response to a force applied to the cardiopulmonary resuscitation device 100. In this embodiment, the cardiopulmonary resuscitation device 100 remains in the activated condition for a predetermined amount of time.

In this embodiment, the biasing circuit 122 is in communication with a converter 120, wherein the converter 120 is in communication with the display screen 116. The biasing circuit 122 and converter 120 provide a potential difference $V_2$ to the display screen 116 when the pressure switch 142 is in the activated condition. The biasing circuit 122 and converter 120 do not provide the potential difference $V_2$ to the display screen 116 when the pressure switch 142 is in the deactivated condition. In this way, the display screen 116, biasing circuit 122 and converter 120 are operatively coupled to the pressure switch 142.

Further, the biasing circuit 132 is in communication with a converter 130, wherein the converter 130 is in communication with the microcontroller 114. The biasing circuit 132 and converter 130 provide a potential difference $V_1$ to the microcontroller 114 when the pressure switch 142 is in the activated condition. The biasing circuit 132 and converter 130 do not provide the potential difference $V_1$ to the microcontroller 114 when the pressure switch 142 is in the deactivated condition. In this way, the microcontroller 114, biasing circuit 132 and converter 130 are operatively coupled to the pressure switch 142.

The cardiopulmonary resuscitation device 100 includes the distance sensor apparatus 160, which is connected to the control circuitry 112 through the sensor cable 146. As will be discussed in more detail below, a sensor signal $S_{Sensor}$ flows between the distance sensor apparatus 160 and control circuitry 112. In particular, the sensor signal $S_{Sensor}$ flows between the distance sensor apparatus 160 and microcontroller 114. The sensor signal $S_{Sensor}$ is provided in response to movement of the cardiopulmonary resuscitation device 100. The sensor signal $S_{Sensor}$ includes information corresponding to a distance that the cardiopulmonary resuscitation device 100 has moved.

Figure 6A:
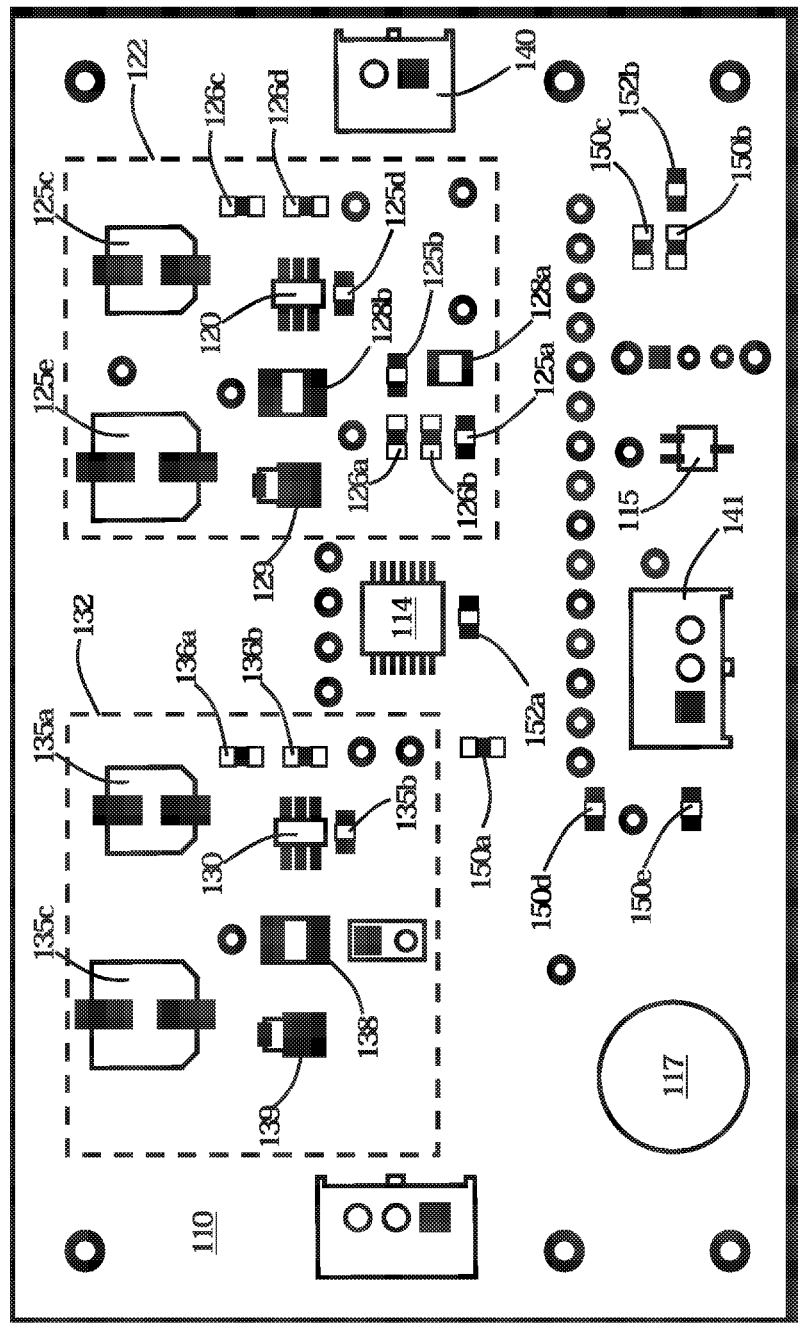
FIG. 6a is a side view of one embodiment of the control circuitry and circuit board of FIGS. 4 and 5.

In this embodiment, the sensor cable 146 is connected to sensor cable connectors 147 and 148 at opposed ends, wherein the sensor cable connector 147 is connected to the distance sensor apparatus 160 in a repeatably removeable manner. The control circuitry 112 includes a sensor cable connector 141 carried by the circuit board 110 (FIG. 6a). The sensor cable connector 148 is connected to the sensor cable connector 141 in a repeatably removeable manner. The control circuitry 112 is in communication with the distance sensor apparatus 160 so the sensor signal $S_{Sensor}$ can flow therebetween. In particular, the microcontroller 114 is in communication with the distance sensor apparatus 160 through the sensor cable 146 and sensor cable connectors 147, 148, and 141. The microcontroller 114 is in communication with the distance sensor apparatus 160 so the sensor signal $S_{Sensor}$ can flow therebetween. In this way, the control circuitry 112 is in communication with the distance sensor apparatus 160.

FIG. 6a is a side view of one embodiment of the control circuitry 112 carried by the circuit board 110 (FIG. 4). The circuit board 110 can be of many different types of circuit boards. In this embodiment, the circuit board 110 is a printed circuit board. As will be discussed in more detail below with the circuit diagrams of FIGS. 6b, 6c, and 6d, the control circuitry 112 includes a plurality of electrical components. The electrical components include conductive pins and/or terminals that extend through openings of the circuit board 110, and are soldered thereto. The pins and terminals are connected together so that the electrical components operate as a circuit.

The electrical components of the control circuitry 112 can be of many different types. For example, the electrical components of the control circuitry 112 include a resistor. The resistor can be of many different types, such as a through-hole and surface mounted resistor. The electrical components of the control circuitry 112 include a capacitor. The capacitor can be of many different types, such as an electrolytic capacitor. Electrolytic capacitors are provided by many different companies, such as Nichicon, which provides the UWT1E100MCL1GB and UWT1E220MCL1GB aluminum electrolytic capacitors. The electrical components of the control circuitry 112 includes an inductor. The inductor can be of many different types, such as a wire wound inductor. Wire wound inductors are provided by many different companies, such as ABRACON Corporation, which provides the AISC-1210HS wire wound inductor. Taiyo Yuden provides the CB2518T331K wire wound inductor. The electrical components of the control circuitry 112 include a diode. The diode can be of many different types, such as a Schottky barrier rectifier. VISHAY Intertechnology provides the SS1P3L and SS1P4L surface mounted Schottky barrier rectifiers. The electrical components of the control circuitry 112 include a connector, such as connectors 140 and 141. The connector can be of many different types of connectors, such as a PCB header. PCB headers are provided by many different companies, such as MOLEX, which provides the 35312 Series of pitch headers.

Figure 6B:
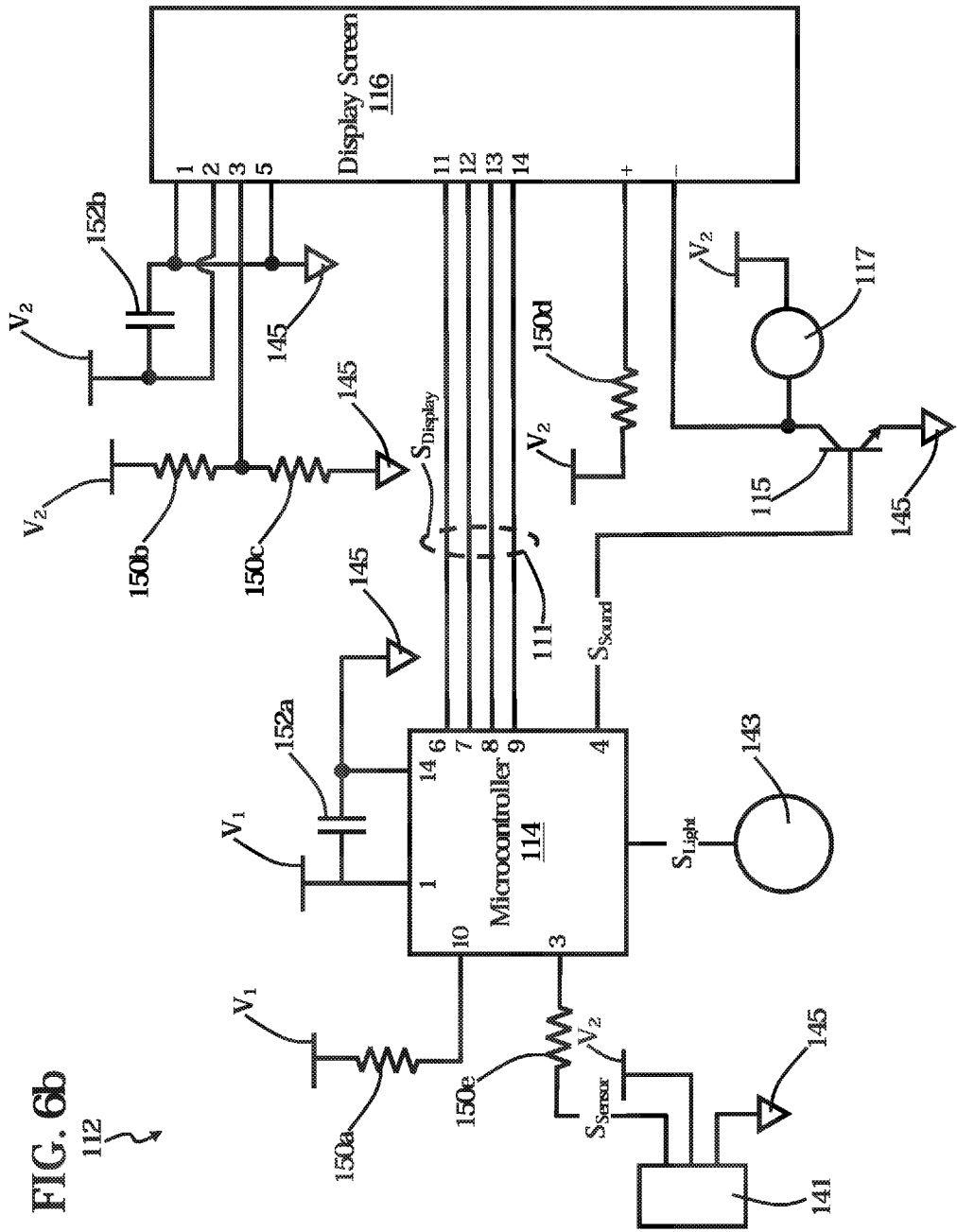
FIG. 6b is a circuit diagram of a first portion of the control circuitry of FIGS. 4, 5, and 6a, wherein the first portion includes a microcontroller and display screen.

FIG. 6b is a circuit diagram of a first portion of the control circuitry 112 of FIGS. 4 and 6a. In this embodiment, the control circuitry includes the microcontroller 114. The microcontroller 114 can be of many different types of microcontrollers. In this embodiment, the microcontroller 114 is a TEXAS INSTRUMENTS MSP430G2 Mixed Signal Microcontroller. A pin 10 of the microcontroller 114 is connected to the reference potential $V_1$ through a resistor 150a. A pin 1 of the microcontroller 114 is connected to the reference potential $V_1$, and a pin 14 of the microcontroller 114 is connected to the current return 145. Pins 1 and 14 of the microcontroller 114 are in communication with each other through a capacitor 152a. A pin 3 of the microcontroller 114 is connected to a first pin of the sensor cable connector 141 through a resistor 150e. It should be noted that the sensor signal $S_{Sensor}$ flows through the resistor 150a between the first terminal of the sensor cable connector 141 and pin 3 of the microcontroller 114. Second and third pins of the sensor cable connector 141 are connected to the reference potential $V_2$ and current return 145, respectively.

A pin 4 of the microcontroller 114 is connected to a control terminal of a transistor 115. The transistor 115 can be of many different types. In this embodiment, the transistor 115 is an NPN transistor, which is provided by NXP as model number PDTD123Y. A first terminal of the transistor 115 is connected to the current return 145.

The control circuitry 112 includes the sound device 117. The sound device 117 can be of many different types. In this embodiment, the sound device 117 is a magnetic buzzer, which is provided by KOBITONE Audio Company as part number 254-EMB105-RO. The sound device 117 includes a first pin connected to the reference potential $V_2$, and a second pin connected to a second terminal of the transistor 115. In this embodiment, the control circuitry 112 includes the luminaire 143. The luminaire 143 can be of many different types, such as a light emitting diode.

The control circuit 112 includes the display screen 116. The display screen 116 can be of many different types. In this embodiment, the display screen 116 is a NHD-0116AZ-FL-YBW liquid crystal display screen, which is provided by Newhaven Display International. The second pin of the sound device 117 is connected to a negative pin of the display screen. The control circuit 112 includes a resistor 150d, which is connected between the reference potential $V_2$ and a positive pin of the display screen 116. Pins 6, 7, 8, and 9 of the microcontroller 114 are connected to pins 11, 12, 13, and 14, respectively, of the display screen 116. It should be noted that the connection between the pins 6, 7, 8, and 9 of the microcontroller 114 and the pins 11, 12, 13, and 14 of the display screen 114 form the display channel 111 (FIG. 5) through which the display signal $S_{Display}$ flows. As will be discussed in more detail below, the display signal $S_{Display}$ can include many different types of information, such as distance and/or rate information.

The control circuitry 112 includes a resistor 150c with a first terminal connected to the current return 145, and a second terminal connected to a pin 3 of the display screen 116. The second terminal of the resistor 150c is connected to a first pin of a resistor 150b. A second pin of the resistor 150b is connected to the reference potential $V_2$. Pins 1 and 5 of the display screen are connected to the current return 145 and to a first terminal of a capacitor 152b. A second terminal of the capacitor 152b is connected to the reference potential $V_2$, and to a pin 2 of the display screen 116.

As discussed above with FIG. 5, the reference potential $V_1$ of FIG. 6b is provided by the converter 120 and biasing circuit 122. Further, the reference potential $V_2$ of FIG. 6b is provided by the converter 130 and biasing circuit 132. One embodiment of a circuit that provides the reference potential $V_1$ is shown in FIG. 6c, and one embodiment of a circuit that provides the reference potential $V_2$ is shown in FIG. 6d.

Figures 6C, 6D:
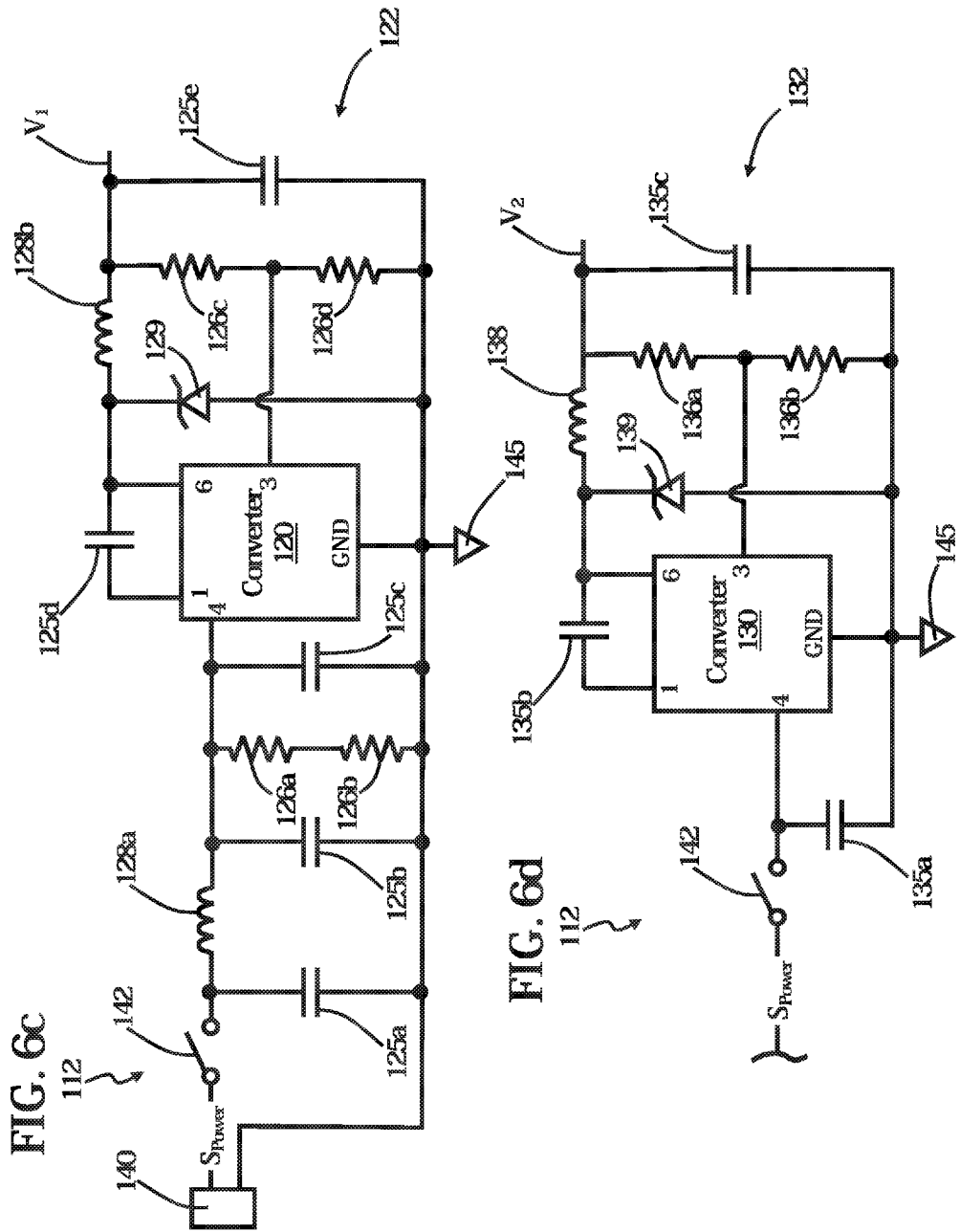
FIG. 6c is a circuit diagram of a second portion of the control circuitry of FIGS. 4, 5, and 6a, wherein the second portion includes a first converter and first biasing circuit, which provide a first reference potential.
FIG. 6d is a circuit diagram of a third portion of the control circuitry of FIGS. 4, 5, and 6a, wherein the second portion includes a second converter and second biasing circuit, which provide a second reference potential.

FIG. 6c is a circuit diagram of a second portion of the control circuitry 112 of FIGS. 4 and 6a, wherein the second portion includes the converter 120 and biasing circuit 122. The converter 120 can be of many different types. In this embodiment, the converter 120 is an asynchronous DC-DC buck converter manufactured by BCD Semiconductor Manufacturing Limited as model number AP3211.

In this embodiment, the control circuitry 112 includes the battery cable connector 140. A first terminal of the battery cable connector 140 is connected to a first terminal of the pressure switch 142, and a second terminal of the battery cable connector 140 is connected to the current return 145. The pressure switch 142 is shown in FIGS. 1, 2, 5 and 8.

In this embodiment, the biasing circuit 122 includes a capacitor 125a with a first terminal connected to the second terminal of the pressure switch 142, and a second terminal connected to the current return 145. The biasing circuit 122 includes an inductor 128a with a first terminal connected to the first terminal of the capacitor 125a, and a second terminal connected to a first terminal of a capacitor 125b. A second terminal of the capacitor 125b is connected to the current return 145.

In this embodiment, the biasing circuit 122 includes a resistor 126a with a first terminal connected to the first terminal of the capacitor 125b and a second terminal connected to a first terminal of a resistor 126b. A second terminal of the resister 126b is connected to the current return 145. The biasing circuit 122 includes a capacitor 125c with a first terminal connected to the first terminal of the resistor 126a and a second terminal connected to the current return 145. The converter 120 includes a pin 4 connected to the first terminal of the capacitor 125c, and a GND terminal connected to the current return 145.

In this embodiment, the biasing circuit 122 includes a capacitor 125d with first and second terminals connected to pin 1 and 6 of the converter 120, respectively. The biasing circuit 122 includes a diode 129 with first and second terminals connected to the pin 6 of the converter 120 and the current return 145, respectively. The biasing circuit 122 includes an inductor 128b with a first terminal connected to the pin 6 of the converter 120, and a second terminal connected to a first terminal of a resistor 126c. The second terminal of the resistor 126c is connected to a pin 3 of the converter 120, and to a first terminal of a resistor 126d. A second terminal of the resistor 126d is connected to the current return 145. The biasing circuit 122 includes a capacitor 125e with a first terminal connected to the second terminal of the inductor 128b, and a second terminal connected to the current return 145. It should be noted that the second portion of the control circuitry 112 of FIG. 6c provides the reference potential $V_1$ at the first terminal of the capacitor 125e.

FIG. 6d is a circuit diagram of a third portion of the control circuitry 112 of FIGS. 4 and 6a, wherein the third portion includes the converter 130 and biasing circuit 132. The converter 130 can be of many different types. In this embodiment, the converter 130 is an asynchronous DC-DC buck converter manufactured by BCD Semiconductor Manufacturing Limited as model number AP3211.

In this embodiment, the biasing circuit 132 includes a capacitor 135a with a first terminal connected to the second terminal of the pressure switch 142, and a second terminal connected to the current return 145. The first terminal of the capacitor 135a is connected to a pin 4 of the converter 130. A GND pin of the converter 130 is connected to the current return 145.

In this embodiment, the biasing circuit 132 includes a capacitor 135b with first and second terminals connected to pin 1 and 6 of the converter 130, respectively. The biasing circuit 132 includes a diode 139 with first and second terminals connected to the pin 6 of the converter 130 and the current return 145, respectively. The biasing circuit 132 includes an inductor 138 with a first terminal connected to the pin 6 of the converter 130, and a second terminal connected to a first terminal of a resistor 136a. A second terminal of the resistor 136a is connected to a pin 3 of the converter 130, and to a first terminal of a resistor 136b. A second terminal of the resistor 136b is connected to the current return 145. The biasing circuit 132 includes a capacitor 135c with a first terminal connected to the second terminal of the inductor 138, and a second terminal connected to the current return 145. It should be noted that the third portion of the control circuitry 112 of FIG. 6d provides the reference potential $V_2$ at the first terminal of the capacitor 135c.

FIG. 7 is a perspective view of the circuit board 110 and control circuitry 112 of FIG. 4, and FIG. 8 is an opposed perspective view of the circuit board and control circuitry 112 of FIG. 4. As mentioned above, the circuit board 110 carries the control circuitry 112 and display screen 116. The control circuitry 112 is connected to the display screen 116, and controls the operation of the display screen 116.

In this embodiment, the control circuitry 112 is connected to the battery 118 through the battery cable 119 (FIG. 4). In this embodiment, a battery cable connector 113 is connected to the battery cable 119, wherein the battery cable connector 113 is repeatably moveable between connected and disconnected conditions with the battery cable connector 140. The battery cable connector 140 is discussed in more detail above with FIGS. 5, 6a, and 6c. The battery 118 (FIG. 4) provides the power signal $S_{Power}$ (FIGS. 5, 6c, and 6d) to the battery cable connector 140 (FIGS. 5, 6a, 6b, and 6c) through the battery cable 119 and battery cable connector 113.

As mentioned above, the distance sensor apparatus 160 (FIG. 4) is connected to the control circuitry 112 through the sensor cable 146. The distance sensor apparatus 160 can be connected to the control circuitry 112 in many different ways. In this embodiment, a sensor cable connector 148 is connected to the sensor cable 146, wherein the sensor cable connector 148 is repeatably moveable between connected and disconnected conditions with the sensor cable connector 141 (FIGS. 5, 6a, and 6b). The sensor signal $S_{Sensor}$ flows between the distance sensor apparatus 160 and the control circuitry 112 when the sensor cable connector 148 is connected to the sensor cable connector 141. In particular, the sensor signal $S_{Sensor}$ flows between the distance sensor apparatus 160 and microcontroller 114 through the sensor cable 146, and sensor cable connectors 141 and 148. The sensor signal $S_{Sensor}$ flows between the sensor cable connector 141 and the microcontroller 114, as shown in FIG. 6b.

In this embodiment, the control circuitry 112 includes the pressure switch 142 (FIGS. 1, 2, 5, 8). As discussed in more detail above, with FIG. 5, the pressure switch 142 turns the cardiopulmonary resuscitation device 100 to the activated condition in response to a force applied thereto. In the on and off positions, the display screen 116 is in an on and off condition, respectively. Further, in the on and off positions, the control circuitry 112 is in an on and off condition, respectively.

In this embodiment, the control circuitry includes the luminaire 144 (FIG. 8). The luminaire 144 can be of many different types of lights, such as a light emitting diode. Light emitting diodes are provided by many different manufacturers, such as CREE and Philips. Visual Communications Company (VCC) provides the VAOL-3GWY4 Superbright LED lamp. The luminaire 144 can provide many different colors of illumination, such as white, red, green, and blue, among others. It should be noted that a lens can be positioned proximate to the luminaire 144. The lens can be of many different types, such as a Fresnel lens. The lens is useful to focus the light provided by the luminaire 144. The lens is also useful to hold the luminaire 144 to the cardiopulmonary resuscitation device 100. As will be discussed in more detail below, the luminaire 144 is useful to provide the user of the cardiopulmonary resuscitation device 100 with a visual indication that the sternum is being compressed and decompressed the desired distance.

Figure 9:
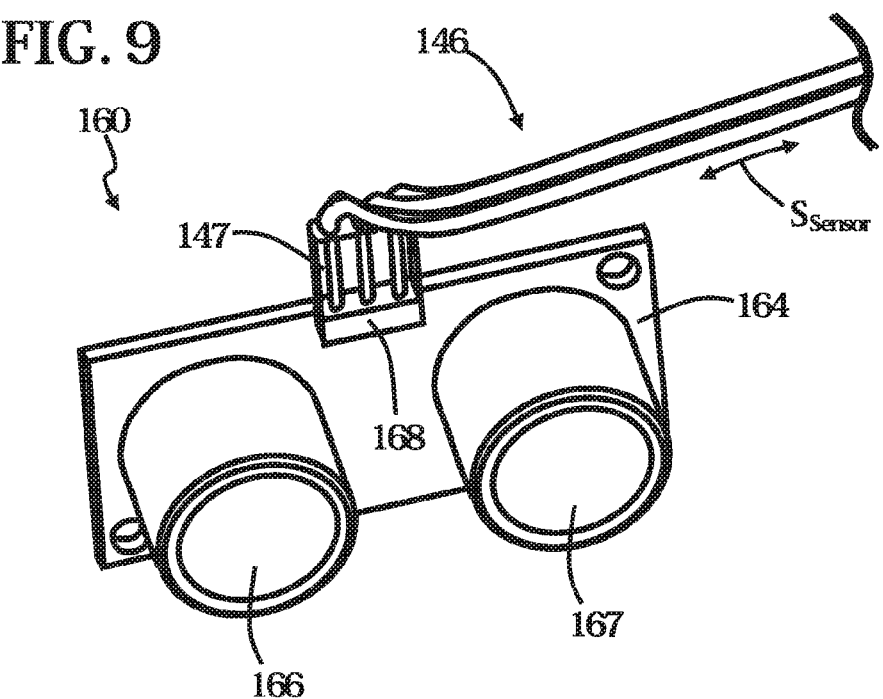
FIG. 9 is a perspective view of the distance sensor apparatus of FIG. 4.
Figure 10:
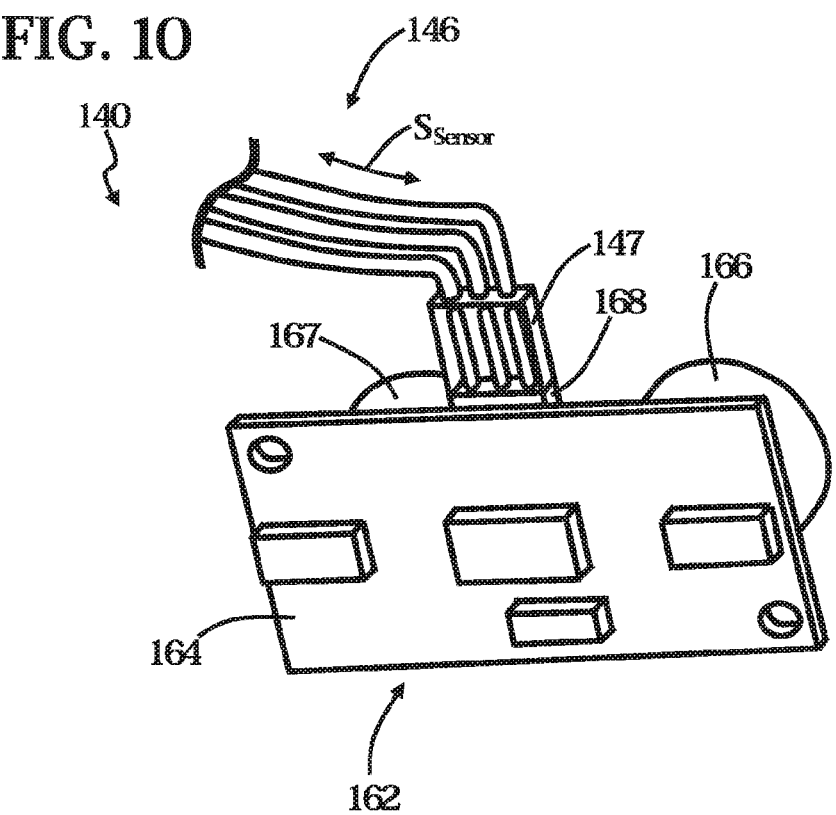
FIG. 10 is an opposed perspective view of the distance sensor apparatus of FIG. 4.

FIG. 9 is a perspective view of a distance sensor apparatus 160 of FIG. 4, and FIG. 10 is an opposed perspective view of the distance sensor apparatus 160 of FIG. 3. The distance sensor apparatus 160 can be of many different types. In this embodiment, the distance sensor apparatus 160 is an ultrasonic distance sensor. There are many different ultrasonic distance sensors that can be used, such as the PING ultrasonic distance sensor, which is provided by PARALAX as model number 28015.

In this embodiment, the distance sensor apparatus 160 includes a circuit board 164, which carries distance sensor circuitry 162 (FIG. 10). The transmit and receive sensors 166 and 167 are carried by the circuit board 164 and operatively coupled to the distance sensor circuitry 162. As mentioned above, the distance sensor apparatus 160 is connected to the sensor cable 146. The distance sensor apparatus 160 can be connected to the sensor cable 146 in many different ways. In this embodiment, the distance sensor apparatus 160 includes a sensor cable connector 168, which is carried by the circuit board 164 and connected to the distance sensor circuitry 162. As mentioned above with FIG. 5, the sensor cable connector 147 is connected to the sensor cable 146. The sensor cable connector 147 is repeatably moveable between connected and disconnected conditions with the sensor cable connector 168. The sensor signal $S_{Sensor}$ is allowed to flow through the sensor cable 146 when the sensor cable connector 147 is connected to the sensor cable 146.

As mentioned above, one reason people do not survive when receiving CPR outside of a hospital is because the CPR is not performed correctly. The operation of the cardiopulmonary resuscitation device 100 will now be discussed to illustrate how it facilitates the correct performance of CPR.

FIG. 11 is a front view of the cardiopulmonary resuscitation device 100 being operated by a user when performing CPR on a patient 170, wherein the patient is supported by a support surface 171 (e.g., a floor or ground). It should be noted that the pressure switch 142 turns the cardiopulmonary resuscitation device 100 to the activated condition in response to the user applying the force thereto. The luminaire 144 moves from the deactivated condition to the activated condition in response to the user applying the force thereto. In particular, the force is applied to the cover 102. Further, it should be noted that transmit and receive sensors 166 and 167 are shown in phantom in FIG. 11.

In this embodiment, the cardiopulmonary resuscitation device 100 is positioned on the chest 172 of the patient 170. In particular, the cardiopulmonary resuscitation device 100 is positioned on the chest 172 of the patient 170 so the case 106 extends across a sternum 174 of the patient 170. It should be noted that the chest 172 is typically resilient, so it moves back into shape after being compressed. In this way, chest 172 forms a resilient surface.

Figure 12A:
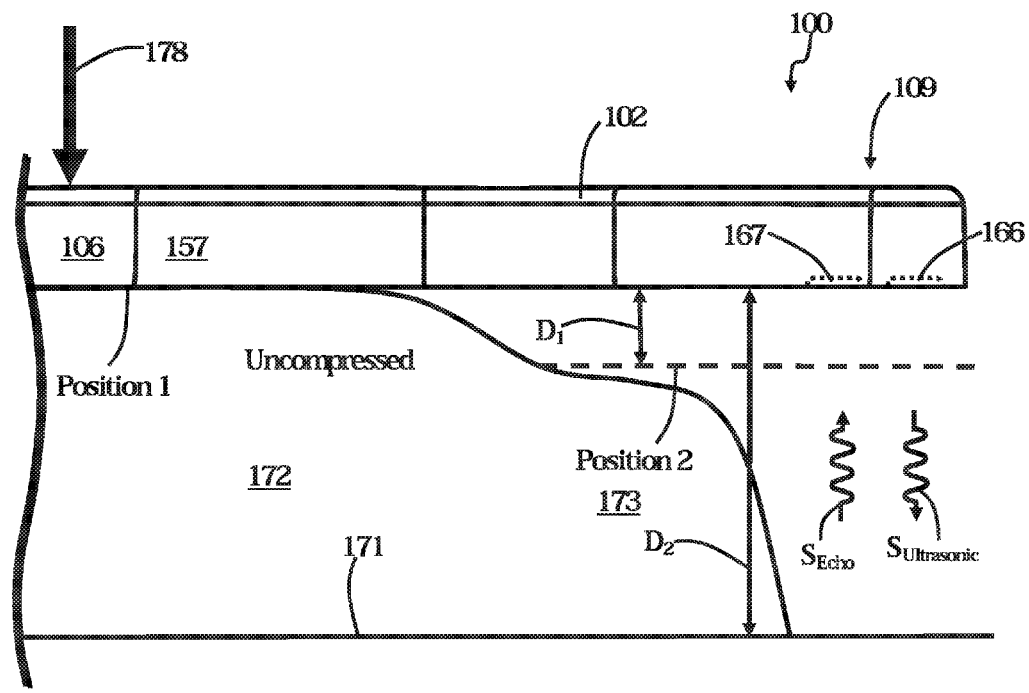
FIG. 12a is a side view of the cardiopulmonary resuscitation device in a direction shown in FIG. 11.
Figure 13A:
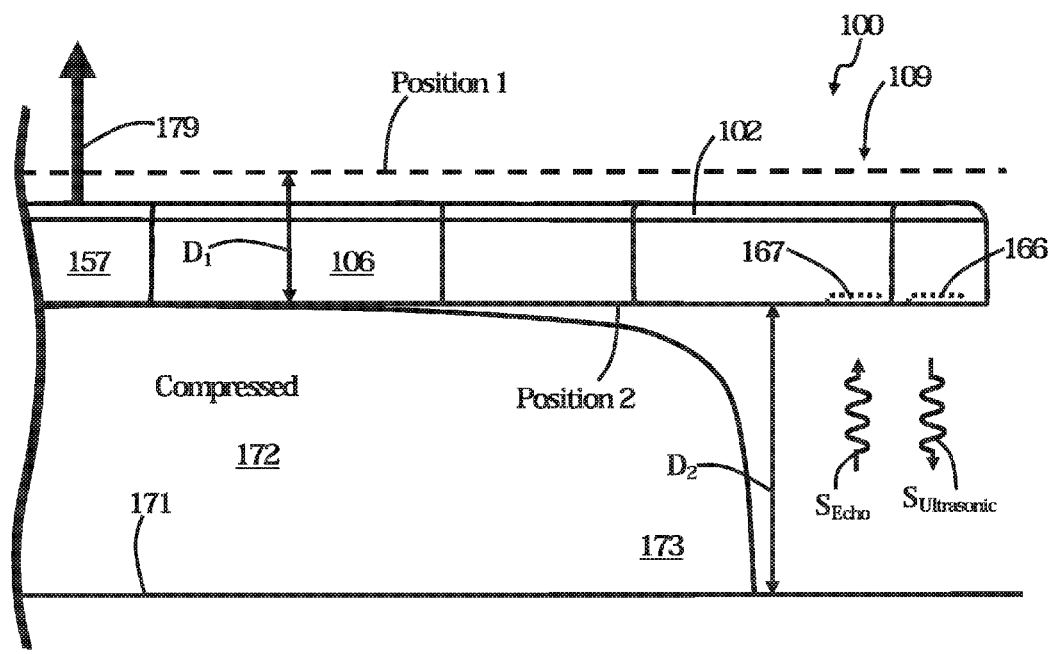
FIG. 13a is a side view of the cardiopulmonary resuscitation device in the direction shown in FIG. 11.

In this embodiment, the cardiopulmonary resuscitation device 100 is positioned on the chest 172 of the patient 170 so that in use, as shown in FIGS. 11, 12a and 13a, the extension portion 109 extends beyond the body of the patient away from the chest 172. In particular, the cardiopulmonary resuscitation device 100 is positioned on the chest 172 of the patient 170 so the extension portion 109 extends away from the sternum 174. The extension portion 109 extends away from the sternum 174 and over a shoulder 173 of the patient 170. The extension portion 109 extends over the shoulder 173 so that the distance sensor apparatus 160 faces the support surface 171. In particular, the extension portion 109 extends over the shoulder 173 so that the transmit sensor 166 and receive sensor 167 face the support surface 171. The extension portion 109 extends away from the chest 172 so the distance sensor apparatus 160 is held away from the chest 172.

Figure 12B:
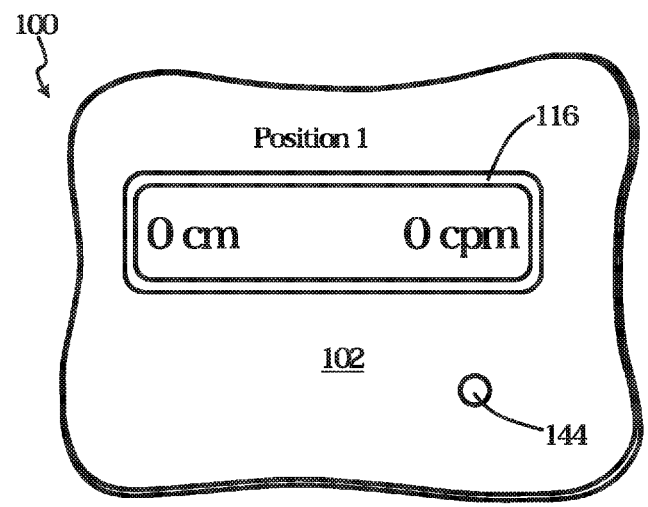
FIG. 12b is a partial view of the cardiopulmonary resuscitation device in a region shown in FIG. 11.

FIG. 12a is a side view of the cardiopulmonary resuscitation device 100 in a direction 176 of FIG. 11, and FIG. 12b is a partial view of the cardiopulmonary resuscitation device 100 in a region 177 of FIG. 11. The cardiopulmonary resuscitation device 100 is shown positioned on the chest 172 in FIG. 12a in the same orientation shown in FIG. 11. It should be noted that the shortened side 157 is shown when looking in the direction 176. Further, it should be noted that the transmit and receive sensors 166 and 167 are shown in phantom in FIG. 12a. As will be discussed in more detail below, the transmit and receive sensors provide an ultrasonic pulse $S_{Ultrasonic}$ and echo pulse $S_{Echo}$, respectively.

As will be discussed in more detail below, it is desirable to move the chest 172 between uncompressed and compressed positions in a repeatable manner. The uncompressed position is denoted as Position 1, and the compressed position is denoted as Position 2. Hence, it is desirable to move the chest 172 between the Positions 1 and 2 in a repeatable manner. The distance between Positions 1 and 2 is denoted as a distance $D_1$. Further, the distance between the Position 1 and the support surface 171 is denoted as a distance $D_2$.

In FIG. 12b, the position of the cardiopulmonary resuscitation device 100 is displayed by the display screen 116.

For simplicity and illustrative purposes, the position of the cardiopulmonary resuscitation device 100 at Position 1 is displayed as "0 cm" by the display screen 116. As will be discussed in more detail below, the display screen will display a distance value corresponding to distance $D_1$ when the cardiopulmonary resuscitation device 100 at Position 2. It should be noted that at Position 1, the luminaire 143 does not provide light, and the sound device 117 does not provide the sound indication. It should also be noted that the distance value is provided to the display screen 116 with the display signal $S_{Display}$.

In this embodiment, the display screen 116 displays information corresponding to the rate in which the chest 172 is moving between the compressed and uncompressed positions. The information corresponding to the rate in which the chest 172 is being compressed and uncompressed is displayed in units of counts per minute (cpm). It should be noted that information corresponding to the rate is provided to the display screen 116 with the display signal $S_{Display}$. In FIG. 12b, the counts per minute is being displayed as "0 cpm" for simplicity and illustrative purposes. Hence, information corresponding to "0 cpm" is provided to the display screen 116 with the display signal $S_{Display}$.

In operation, and as shown in FIG. 12a, a force 178 is applied to the cardiopulmonary resuscitation device 100 and, in response, the cardiopulmonary resuscitation device 100 moves from the deactivated condition to the activated condition. In some embodiments, the cardiopulmonary resuscitation device 100 remains in the activated condition for a predetermined amount of time in response to the force 178 being applied thereto. The force 178 is applied to the cardiopulmonary resuscitation device 100 so that the chest 172 moves from the uncompressed position at Position 1 to the compressed position at Position 2 in response. In particular, the force 178 is applied to the cover 102 and case 106. The force 178 is typically applied using the hands (not shown) of the user of the cardiopulmonary resuscitation device 100.

It should be noted that the force 178 is applied more evenly across the chest 172 and sternum 174 because the cardiopulmonary resuscitation device 100 is positioned as shown in FIG. 11. Recent medical studies show that applying the force 178 across the chest 172 and sternum 174 increases the likelihood that the patient 170 will survive. In particular, the force 178 is distributed along the length axis 103 (FIG. 2). It is believed that distributing the force 178 along the length axis 103 increases the likelihood that the patient 170 will survive.

Figure 13B:
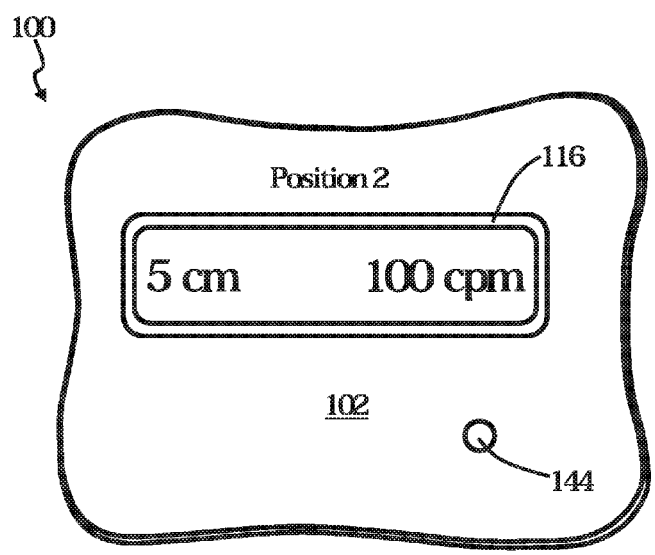
FIG. 13b is a partial view of the cardiopulmonary resuscitation device in the region shown in FIG. 11.

FIG. 13a is a side view of the cardiopulmonary resuscitation device 100 in the direction 176 of FIG. 11, and FIG. 13b is a partial view of the cardiopulmonary resuscitation device 100 in the region 177 of FIG. 11. The cardiopulmonary resuscitation device 100 is shown positioned on the chest 172 in FIG. 13a in the same orientation shown in FIG. 11. It should be noted that the shortened side 157 is shown when looking in the direction 176. Further, it should be noted that the transmit and receive sensors 166 and 167 are shown in phantom in FIG. 13a.

In operation, the distance sensor apparatus 160 provides the ultrasonic pulse $S_{Ultrasonic}$ towards the support surface 171 with the transmit sensor 166, and the distance sensor apparatus 160 receives the echo pulse $S_{Echo}$ with the receive sensor 167 in response. It should be noted that the echo pulse $S_{Echo}$ corresponds to the ultrasonic pulse $S_{Ultrasonic}$ being reflected by the support surface 171. The distance sensor apparatus 160 provides the ultrasonic pulse $S_{Ultrasonic}$ and receives the echo pulse $S_{Echo}$ in response to the cardiopulmonary resuscitation device 100 being moved between Positions 1 and 2.

The sensor signal $S_{Sensor}$ is provided to the microcontroller 114 by the distance sensor apparatus 160 in response to the ultrasonic pulse $S_{Ultrasonic}$ being transmitted. The sensor signal $S_{Sensor}$ is terminated in response to the echo pulse $S_{Echo}$ being received by the receive sensor 167. The width of the echo pulse $S_{Echo}$ corresponds to the distance $D_2$ the ultrasonic pulse traveled. Information corresponding to the width of the echo pulse $S_{Echo}$ is provided to the control circuitry 112 with the sensor signal $S_{Sensor}$. In particular, information corresponding to the width of the echo pulse $S_{Echo}$ is provided to the microcontroller 114 with the sensor signal $S_{Sensor}$ (FIGS. 5, 6b, and 7). The microcontroller 114 determines the distance $D_1$ by determining the width of the echo pulse $S_{Echo}$. Information corresponding to the distance $D_1$ is provided to the display screen 116 by the microcontroller 114 through the display channel 111 (FIGS. 5 and 6b). It should be noted that information corresponding to the distance $D_1$ is provided to the display screen 116 with the display signal $S_{Display}$.

As shown in FIG. 13a, the cardiopulmonary resuscitation device 100 has moved from the Position 1 to Position 2, which corresponds to a movement of the distance $D_1$. Hence, the display screen 116 displays a distance value corresponding to distance $D_1$. In FIG. 13b, the distance value is chosen to be "5 cm" because recent medical studies show that this is the optimum compression distance for CPR. Information corresponding to "5 cm" is provided to the display screen 116 in the display signal $S_{Display}$. It should be noted that the distance value can have many other values that depend on the distance $D_1$ between Positions 1 and 2. The display screen 116 will display the distance that the cardiopulmonary resuscitation device 100 has moved during CPR so that the user will know how far the chest 172 has been compressed. It is believed that the distance value of about 5 centimeters is desired to increase the likelihood that the patient 170 will survive CPR.

It should be noted that at Position 2, the luminaire 143 does provide light, and the sound device 117 does provide sound the sound indication. In this way, the cardiopulmonary resuscitation device 100 provides a visual and audio indication that the chest 172 has been compressed a desired amount. Further, the cardiopulmonary resuscitation device 100 does not provide the visual and audio indication if the chest 172 has not been compressed the desired amount. In response to the visual and audio indication, the user removes the force 178 so that the chest 172 moves from Position 2 to Position 1. The movement of the chest 172 from Position 2 to Position 1 is indicated by a force 179. It should be noted that the force 179 can be from the resiliency of the chest 172.

It should be noted that the display screen 116 displays distance values between Position 1 and Position 2 while the cardiopulmonary resuscitation device 100 is moving therebetween. Hence, in the example above, the display screen 116 will display "2.5 cm" when the cardiopulmonary resuscitation device 100 is halfway between Positions 1 and 2. In this way, the display screen 116 displays an intermediate distance value. It should be noted that information corresponding to the intermediate distance values is provided to the display screen 116 with the display signal $S_{Display}$.

As mentioned above, the display screen 116 displays information corresponding to the rate in which the chest 172 is being compressed and uncompressed. In FIG. 13b, the counts per minute is being displayed as "100 cpm" for simplicity and illustrative purposes. Recent medical studies show that the rate value of about 100 cpm is desired to increase the likelihood that the patient 170 will survive CPR. In this way, the cardiopulmonary resuscitation device 100 provides the user with information corresponding to the rate of compressions. It should be noted that information corresponding to "100 cpm" is provided to the display screen 116 with the display signal $S_{Display}$.

Hence, the invention provides a cardiopulmonary resuscitation device which facilitates the ability of the user to correctly perform CPR on a patient. The cardiopulmonary resuscitation device provides a visual indication that CPR is being performed at a desired rate of compressions and decompressions. Further, the cardiopulmonary resuscitation device provides visual and audio indications that the chest of the patient has been compressed by a desired amount. The cardiopulmonary resuscitation device is also shaped so that the force applied to the chest of the patient is applied more evenly, so that the entirety of the thoracic cavity is compressed and not just one sharp point. These features of the cardiopulmonary resuscitation device allow the user to increase the likelihood that the patient will survive CPR.

Figure 14A:
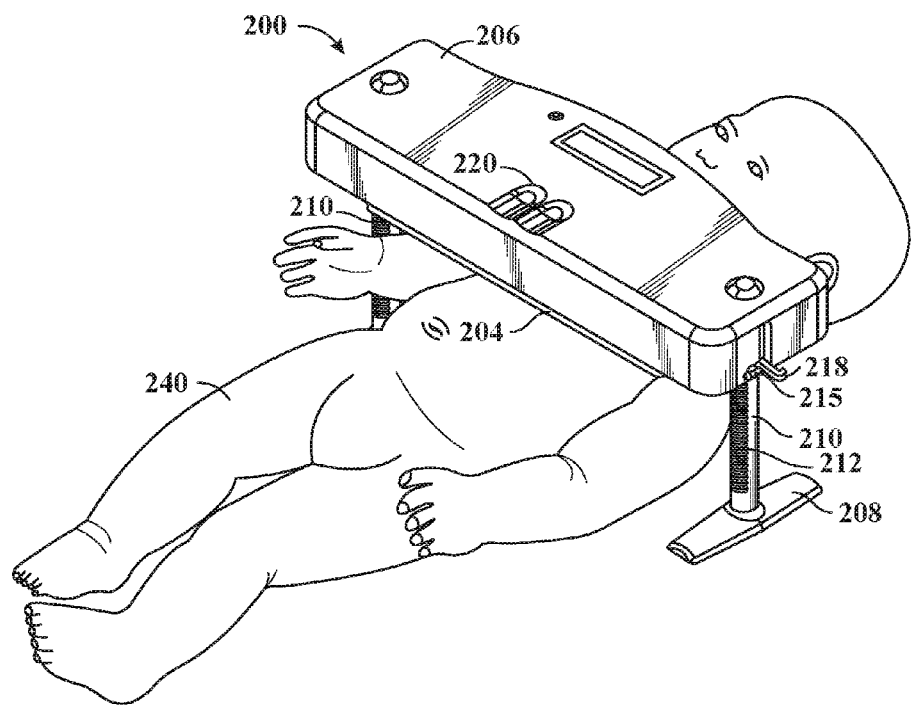
FIG. 14a is a perspective view of a cardiopulmonary resuscitation device suitable for use for infants, according to another embodiment.

FIG. 14a is a perspective view of a cardiopulmonary resuscitation device 200, according to another embodiment. The cardiopulmonary resuscitation device 200 is similar in many respects to the cardiopulmonary resuscitation device 100 except that it is designed for use on infants. As illustrated, the cardiopulmonary resuscitation device 200 includes a case 206 that is smaller in size than the case 106 since it is to be used on a small-sized person. A protection layer 204, constructed of a high-density foam material or the like, is disposed on a bottom surface of the case 206 so that compressions are gentler. Legs 210 support the case 206 and permit the case 206 to be lowered onto the chest of the infant 240. The legs 210 support the case 206 and permit the case 206 to be positioned on the chest of the small person or infant 240, the case 206 extending across the chest and upper arms of the infant 240 so each leg 210 of the pair of legs supports the case 206 and extends generally exterior of an arm of the infant 240. Each of the legs 210 may further include feet 208 on respective distal ends. The legs 210 can include a plurality of notches 212 each of which is set apart a predetermined distance. The legs 210 are prevented from being lowered by detents 215. In operation, the detents 215 can be released by pulling tabs 218 which allow the case 206 to freely side down until it touches the chest of the infant 240. When the case 206 reaches the proper position, the tabs 218 can be released to again lock the detents 215.

Figure 14B:
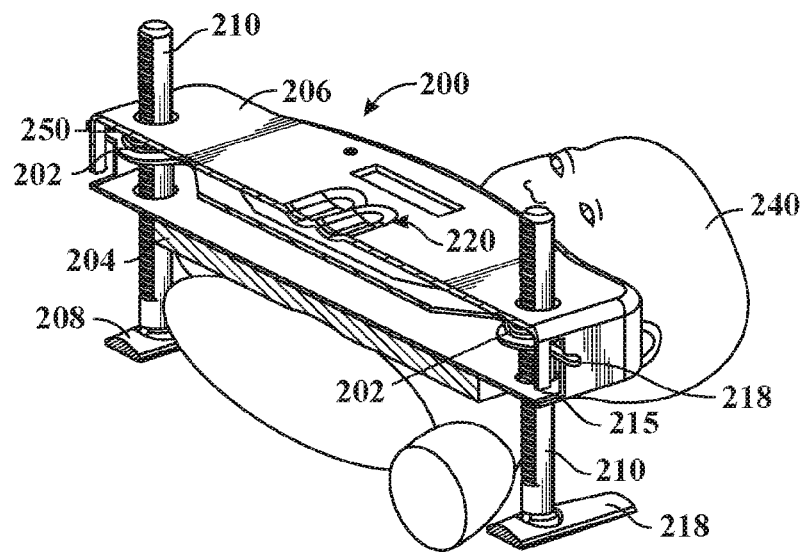
FIG. 14b is a cutaway view of the cardiopulmonary resuscitation device of FIG. 14a in the compression phase of CPR.

FIG. 14b is a cutaway view of the cardiopulmonary resuscitation device 200 in the compression phase. In the compression phase, the device 200 compresses the chest and sternum of the infant 240. In operation, compression can occur by pressing down on finger pads 220. The pressing motion causes the case 206, to push against the chest and sternum of the infant, distributing the pressing force substantially evenly along the length axis of the case 206 and across the chest and sternum of the infant 240. Decompression is facilitated by springs 202 that urge the case 206 back upwardly when pressure against the finger pads 220 is momentarily released.

Figure 14C:
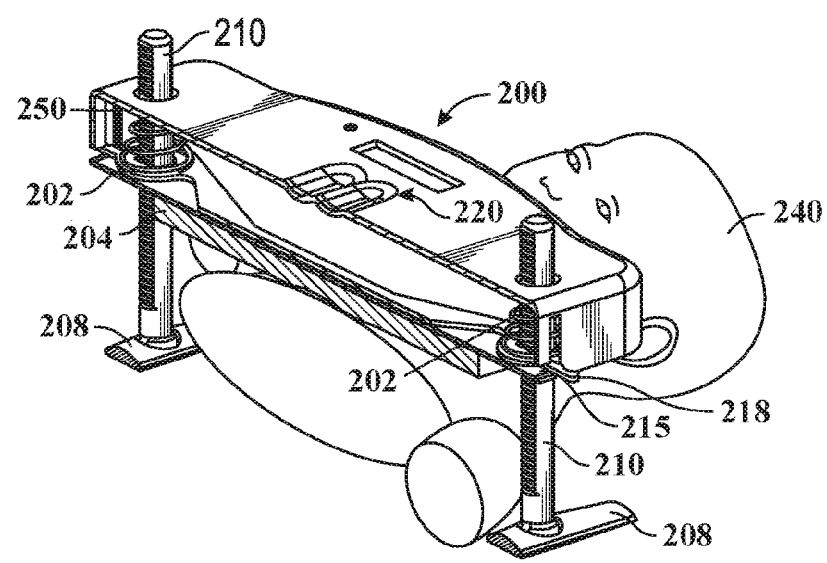
FIG. 14c is a cutaway view of the cardiopulmonary resuscitation device of FIG. 14a in the decompression phase of CPR.

FIG. 14c is a cutaway view of the cardiopulmonary resuscitation device 200 in the decompression phase. Although other embodiments of the cardiopulmonary resuscitation device utilize an ultrasonic distance sensor, the cardiopulmonary resuscitation device 200 need not use an ultrasonic distance sensor. Instead, a limit switch can be used to determine whether the case 206 has been moved a proper distance. In an embodiment, the springs 202 are only able to compress about 3 mm. Once the distance traveled is reached, the springs 202 concurrently hit a hard stop and a limit switch 250. Once the limit switch is activated, it can activate the luminaire 143 and cause the sound device 117 to emit an audible sound, as described previously with respect to other embodiments. Furthermore, the data from the limit switch can be used by a microcontroller or equivalent to measure and then display the number of compressions per minute on the display screen 116.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

The invention claimed is:

1. A cardiopulmonary resuscitation device, comprising:
a case having opposed shortened sides, opposed lengthened sides and a length axis; and
a support structure including a pair of support legs extending through the case, the support structure supporting the case and adapted to permit the case to be positioned on a chest of an infant-sized human, the case and the length axis adapted to extend across the chest and a sternum of the infant-sized human, with a support leg at each opposed shortened side supporting the case, and adapted to extend generally exterior of an arm of the infant-sized human;
wherein the case is useable to perform cardiopulmonary resuscitation on the infant-sized human by repeated press-release movements which apply a compressive force along the length axis of the case and across the chest and sternum of the infant-sized human.

2. The device of claim 1, wherein the legs are adjustable in length and permit the case to be lowered as the legs are shortened when the case is initially positioned.

3. The device of claim 2, wherein each of the legs include feet.

4. The device of claim 1, wherein the legs are lockable.

5. The device of claim 1, wherein the case further includes a protection layer disposed on a bottom surface of the case.

6. A cardiopulmonary resuscitation device, comprising:
a case having a bottom surface and a protection layer disposed on the bottom surface of the case, the protection layer including a compressible elastic material; and
a support structure including a pair of legs extending through the case, the support structure adapted to permit the case to be positioned on the chest of an infant-sized human;
wherein the case is useable to perform cardiopulmonary resuscitation on the infant-sized human by repeated press-release movements.

7. A cardiopulmonary resuscitation device, comprising:
a case including finger pads; and
a support structure including a pair of legs extending through the case, the support structure adapted to permit the case to be positioned on the chest of an infant-sized human;
wherein the case is useable to perform cardiopulmonary resuscitation on the infant-sized human by repeated press-release movements, and the finger pads facilitate the press-release movements.

8. The device of claim 1, further including at least one spring internal to the case to urge the case in an upward direction after being pressed downwardly.

9. The device of claim 8, wherein compression of the at least one spring is limited by a hard stop.

10. The device of claim 1, wherein the device emits an audible alert when the case is pressed a predetermined distance.

11. The device of claim 1, wherein the device activates a luminaire when the case is pressed a predetermined distance.

12. The device of claim 1, wherein the case further includes a display that displays the number of compressions per minute.

13. A cardiopulmonary resuscitation device, comprising:
a case;
a support structure supporting the case, including a pair of legs extending through the case;
a luminaire;
a sound device; and
a display,
wherein the case is useable to perform cardiopulmonary resuscitation by repeated press-release movements, the sound device emits an audible alert when the case is compressed a predetermined distance, the device activates the luminaire when the case is compressed a predetermined distance, and the display displays a number of compressions per minute.

14. The device of claim 13, wherein the case includes finger pads to facilitate the press-release movements.

15. The device of claim 13, wherein the case further includes a protection layer disposed on a bottom surface of the case.

16. The device of claim 15, further including at least one spring internal to the case to urge the case in an upward direction after being pressed downwardly.

17. The device of claim 16, wherein compression of the at least one spring is limited by a hard stop.

18. A cardiopulmonary resuscitation device, comprising:
a case having a cover; and
a support structure including a pair of legs extending through the case and the cover;
wherein the support structure permits the case to be initially positioned by adjusting the length of the legs; and
wherein the case is useable to perform cardiopulmonary resuscitation on an infant-sized human by repeated press-release movements of the case, the press-release movements being effected by a user applying force by hand directly to the cover and the case.

* * * * *